United States Patent [19]

Murai et al.

[11] Patent Number: 4,841,017
[45] Date of Patent: Jun. 20, 1989

[54] POLYETHER COMPOUNDS, EPOXY RESINS AND PROCESSES FOR PRODUCTION THEREOF

[75] Inventors: Takaaki Murai; Katsuhisa Sakai, both of Hiroshima, Japan

[73] Assignee: Daicel Chemical Industries, Ltd., Osaka, Japan

[21] Appl. No.: 167,680

[22] Filed: Mar. 11, 1988

[30] Foreign Application Priority Data

Aug. 17, 1987 [JP] Japan ................................ 62-203919
Aug. 18, 1987 [JP] Japan ................................ 62-204868
Aug. 25, 1987 [JP] Japan ................................ 62-212139
Aug. 31, 1987 [JP] Japan ................................ 62-215526

[51] Int. Cl.$^4$ ................... C08G 59/02; C07D 303/12
[52] U.S. Cl. .............................. 525/327.3; 525/403; 528/365; 528/393; 549/524; 549/551; 549/554; 549/561
[58] Field of Search ..................... 525/327.3, 403; 528/361, 393; 549/524, 551, 554, 561

[56] References Cited

U.S. PATENT DOCUMENTS

| | | | |
|---|---|---|---|
| 3,294,658 | 12/1966 | Atchison et al. | 522/170 |
| 3,459,775 | 8/1969 | Rick et al. | 549/554 |
| 3,676,375 | 7/1972 | Borchert et al. | 528/393 X |
| 4,565,859 | 1/1986 | Murai et al. | 528/365 |

FOREIGN PATENT DOCUMENTS

904549 6/1960 United Kingdom .

Primary Examiner—Earl Nielsen
Attorney, Agent, or Firm—Sughrue, Mion, Zinn, Macpeak and Seas

[57] ABSTRACT

Disclosed as a polyether compound having ether groups and vinyl double bonds represented by formula (I)

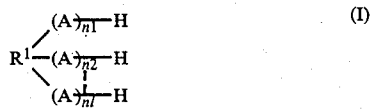

and an epoxy resin represented by formula (II)

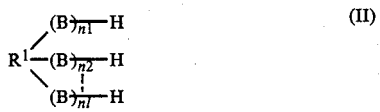

wherein $R^1$ represents a residue group of an organic compound having 1 active hydrogen atoms, n1 through nl each represents 0 or an integer of from 1 to 100, the sum of integers represented by n1 through nl is from 1 to 100, and l represents an integer of from 1 to 100, and A represents from 1 to 100, and A represents

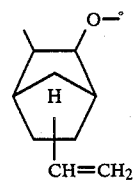

or a mixture of

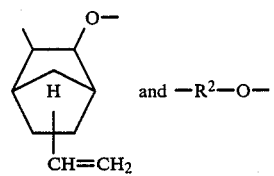

wherein $R^2$ represents a residue group of mono epoxy compound, and B represents

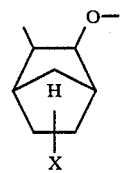

or a mixture of

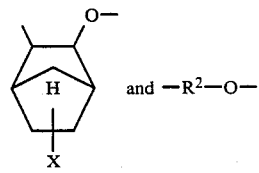

wherein X represents a

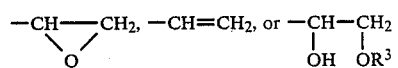

group,
wherein $R^3$ represents a hydrogen atom, an alkyl group, an alkyl carbonyl group, or an arylcarbonyl group, provided that the epoxy resin represented by formula (II) contains at least one

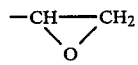

group:
In a further aspect, the invention relates to processes for production thereof.

7 Claims, No Drawings

POLYETHER COMPOUNDS, EPOXY RESINS AND PROCESSES FOR PRODUCTION THEREOF

FIELD OF THE INVENTION

This invention relates to novel polyether compounds having vinyl norbornane units, and novel epoxy resins having oxynorbornane units which have substituent groups, and to processes for production of said polyether compounds and said epoxy resins. The epoxy resins of the present invention have excellent heat resistivity and water resistivity and weatherability.

BACKGROUND OF THE INVENTION

Hitherto, polyether compounds such as polyethylene glycol, polypropylene glycol, polytetramethylene glycol, etc., have been widely used as raw materials for resins, such as polyurethanes, for coatings, adhesives, molding materials, etc. Many of these polyether compounds have a hydroxyl group at the terminal portion thereof, which causes a problem in that the scope of applications for use is restricted in the case of using them as a raw material for resins.

For the purpose of overcoming this problem, polyether compounds having an allyl group at the terminal portion thereof, which are prepared by polymerizing the glycidyl group of allyl glycidyl ether, and polyester compounds having a vinyl group at the terminal portion thereof, which are prepared by thermal decomposition of polypropylene glycol, etc., have been used.

However, many resins obtained by using these compounds are insufficient in hardness and strength, though they have excellent flexibility, because the molecular structure of these compounds is straight chain.

On the other hand, epoxy resins which have been widely used include epi-bis type epoxy resins produced by reacting bisphenol A and epichlorohydrin.

These resins have advantages, in that various products are obtained, from a state of liquid to solid, and they can be cured at room temperature with polyamines because reactivity of epoxy resins is high.

However, cured products thereof have faults in that the weatherability is inferior, electric properties such as anti-tracking property, etc., are inferior, and the heat distortion temperature is low, although they do have desirable characteristics of good water resistivity and strength.

In recent years, particularly, epoxy resins prepared by reacting phenol resin with epichlorohydrin have been used as resins for encapsulating VLSI (very large scale integrated circuits), etc., but chlorine contained in the resins, typically in an amount of several hundred parts per million, causes the problem of deteriorating the electric properties of such electronic devices.

Epoxy resins having excellent electric properties and heat resistance which do not contain chlorine are known, such as certain alicyclic epoxy resins.

These have been produced by an epoxidation reaction of a compound having a 5- or 6-membered cycloalkenyl structure. The epoxy group in these resins is the so-called inner epoxy group, and curing is usually carried out with acid anhydrides by heating.

However, since reactivity is low, they cannot be cured with polyamines at room temperature.

Therefore, use of the alicyclic epoxy resins is restricted within a very narrow scope.

As alicyclic epoxy resins, those having a structure represented by (III) or (IV) have been industrially produced and used.

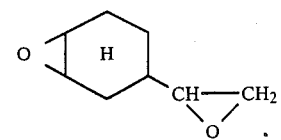

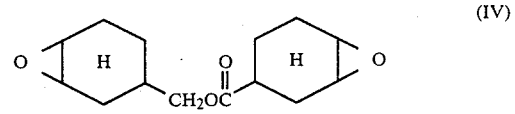

(III) has been used as a heat resisting epoxy diluent, because of having a very low viscosity, but is has high toxicity and causes problems of poisoning by contacting skin of the human body.

(IV) contains only small amounts of impurities and has low color hue, and cured products produced therewith have a high heat distortion temperature, but its use involves problems of inferior water resistivity due to the ester bond.

In addition, because both (III) and (IV) are liquid state epoxy resins having a low viscosity, it is impossible to apply molding systems for solid epoxy resins, such as transfer molding, etc., to them.

To overcome such problems, polyether compounds which have cyclohexane units having a vinyl group, and epoxy resins which have oxycyclohexane units having a substituent, which are solid state epoxy at room temperature (about 20° C.), have been developed, as described in the U.S. Pat. No. 4,565,829 (Japanese Unexamined Patent Application No. 1985-14859, etc.).

SUMMARY OF THE INVENTION

As a result of extensive studies in order to develop novel polyether compounds and epoxy resins, there have now been found novel polyether compounds which have norbornane units having a vinyl group, and epoxy resins which have oxynorbornane units having substituents. Furthermore, it has surprisingly been found that such polyether compounds and epoxy resins are quite superior to the above mentioned polyether compounds and epoxy resins, in heat resistance, water resistance, flexibility, glass transition temperature, etc.

Thus, the present invention is directed to a polyether compound having ether groups and vinyl double bonds represented by formula (I)

and an epoxy resin represented by formula (II)

wherein $R^1$ represents a residue group of an organic compound having l active hydrogen atoms, n1 through nl each represents 0 or an integer of from 1 to 100, the sum of integers represented by n1 through nl is from 1 to 100, and l represents an integer of from 1 to 100, and A represents

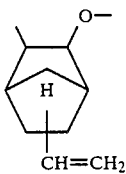

or a mixture of

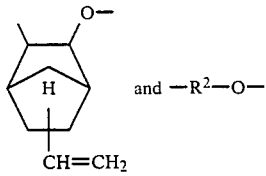

wherein $R^2$ represents a residue group of a mono epoxy compound, and B represents

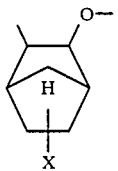

or a mixture of

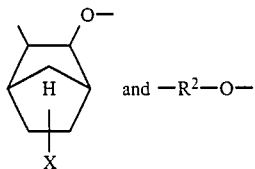

wherein X represents a

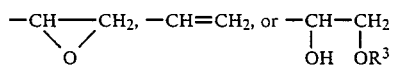

group, wherein $R^3$ represents a hydrogen atom, an alkyl group, an alkyl carbonyl group, an arylcarbonyl group, provided that the epoxy resin represented by formula (II) contains at least one

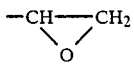

group.

In a further aspect, the present invention relates to processes for production thereof.

DETAILED DESCRIPTION OF THE INVENTION

In the polyether compound represented by formula (I) and the epoxy resin represented by formula (II) of the present invention, $R^1$ is a residue group of an organic compound having active hydrogen atoms.

Any residue group can be used, if it is a residue group of a compound having active hydrogens. Two or more thereof can also be mixed. Examples of organic compounds having active hydrogen atoms which are precursors of such residue groups include alcohols, phenols, carboxylic acids, amines, and thiols, with alcohols being preferred.

As alcohols, for instance, either monohydric alcohols or polyhydric alcohols may be used. Examples include aliphatic alcohols having from 1 to 100 carbon atoms, which may have unsaturated groups, such as methanol, ethanol, propanol, butanol, pentanol, hexanol, octanol, allyl alcohol, etc., aromatic alcohols such as benzyl alcohol, and polyhydric alcohols such as ethylene glycol, diethylene glycol, triethylene glycol, polyethylene glycol, propylene glycol, dipropylene glycol, 1,3-butanediol, 1,4-butanediol, pentanediol, 1,6-hexanediol, neopentyl glycol, neopentyl glycol oxypivalate, cyclohexane dimethanol, glycerine diglycerine, polyglycerine, trimethylolpropane, trimethylolethane, pentaerythritol, dipentaerythritol, etc.

Phenols include phenol, cresol, catecol, pyrogallol, hydroquinone, hydroquinone monomethylether, bisphenol A, bisphenol F, 4,4'-dihydroxybenzophenone, bisphenol S, phenol novolak resins, cresol novolak resins, etc.

Carboxylic acids include formic acid, acetic acid, propionic acid, butyric acid, fatty acid of animal and vegetable oils and fats, fumaric acid, maleic acid, adipic acid, dodecanedioic acid, trimellitic acid, pyromellitic acid, polyacrylic acid, phthalic acid, isophthalic acid, terephthalic acid, etc.

In addition, compounds having a hydroxyl group together with a carboxylic acid group such as lactic acid, citric acid, oxycaproic acid, etc., are appropriate precursors for $R^1$ residue groups.

Amines include methylamine, ethylamine, propylamine, butylamine, pentylamine, hexylamine, cyclohexylamine, octylamine, dodecylamine, 4,4'-diaminodiphenylmethane, isophoronediamine, toluenediamine, hexamethylene diamine, xylene diamine, diethylene triamine, triethylene tetramine, ethanolamine, etc.

Thiols include mercaptans such as methyl mercaptan, ethyl mercaptan, propyl mercaptan, phenyl mercaptan, etc., mercaptopropioic acid and polyhydric alcohol esters of mercaptopropioic acid, such as ethyleneglycol bismercaptopropionate, trimethylolpropane trimercaptopropionate, pentaerythritol tetrakismercaptopropionate, etc.

Other compounds having active hydrogen atoms include polyvinyl alcohol, partially hydrolyzed products of polyvinyl acetate, starch, cellulose, cellulose acetate, cellulose acetate butyrate, hydroxyethyl cellulose, acrylic polyol resins, styrene-allyl alcohol copolymer resins, styrene-maleic acid copolymer resins, alkyd resins, polyester polyol resins, polyester carboxylic acid resins, polycaprolactone polyol resins, polypropylene polyol, polytetramethyleneglycol, etc.

The compounds having active hydrogen atoms may have an unsaturated double bond in their structure, examples of which include allyl alcohol, acrylic acid, methacrylic acid, 3-cyclohexenemethanol, tetrahydrophthalic acid, etc. The unsaturated double bond in these compounds may have a structure that is epoxidated.

n1 through n in formulae (I) and (II) are each 0 or an integer of from 1 to 100, and the sum of the integers representing n1 through nl is from 1 to 100, preferably from 10 to 20, and more preferably about 15. If it is more than 100, solids or resins having a very high softening point are obtained, which are difficult to handle and use from a practical viewpoint.

represents an integer of from 1 to 100, and defines the number of active hydrogen atoms in the organic compound having active hydrogen atoms which is a precursor of the residue group $R^1$.

The polyether compounds represented by formula (I) of the present invention can be obtained by reacting a compound having active hydrogen atoms with 5-vinyl-bicyclo[2.2.1]hepta-2-en-2-oxide (vinyl norbornene oxide) represented by the formula

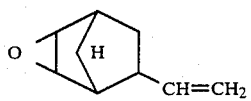

or a mixture of the compound and a mono epoxy compound in the presence of a catalyst.

By varying the reaction ratio of 5-vinylbicyclo[2.2.1]hepta-2-en-2-oxide or a mixture of said compound and a mono epoxy compound to a compound having active hydrogen atoms, vinyl compounds (I) containing various numbers of ether groups wherein n1 through nl is up to 100 can be obtained.

In practice, the resulting compound is typically a mixture of compounds represented by formula (I).

Catalysts used for the reaction include amines such as methylamine, ethylamine, propylamine, piperazine, etc., organic bases such as pyridines, imidazoles, etc., quarternary ammonium salts such as tetramethylammonium chloride, tetrabutylammonium bromide, etc., organic acids such as formic acid, acetic acid, propionic acid, etc., inorganic acids such as sulfuric acid, hydrochloric acid, etc., phosphines such as triphenylphosphine, etc., alcoholates such as sodium methylate, etc., alkalis such as KOH, NaOH, etc., Lewis acids such as $BF_3$, $ZnCl_2$, $AlCl_3$, $SnCl_4$, complex compounds of the Lewis acid, etc., and organometallic compounds such as triethyl aluminum, diethyl zinc, etc.

These catalysts are used in a concentration of from 0.01% to 10%, and preferably from 0.1% to 5%, based on the weight of the starting materials. In the case of the amount of catalyst being less than 0.01%, the reaction does not proceed at all or the reaction rate is very slow if the reaction proceeds. In the case of the amount of catalyst being more than 10%, the excess catalyst is believed to be useless in practice. The reaction can be carried out in the presence of the catalyst at a suitable temperature, generally from $-20°$ C. to $200°$ C., and preferably from $0°$ C. to $120°$ C. The reaction can be carried out in the absence of a solvent, or in the presence of a suitable organic solvent not having active hydrogen atoms, for example, ketones such as acetone, methyl ethyl ketone, methyl isobutyl ketone, etc., aromatic solvents such as benzene, toluene, xylene, etc., ethers, aliphatic hydrocarbons, esters.

An oxynorbornane structure having a vinyl group

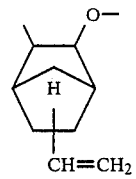

or $-R^2-O-$ structure represents a residue of a ring opened product of an oxide group in 5-vinylbicyclo[2.2.1]hepta-2-en-2-oxide (vinylnorbornene oxide) or an aliphatic or aromatic compound having an oxide group, respectively, in the polyether compounds (I) of the present invention.

5-vinylbicyclo[2.2.1]hepta-2-en-2-oxide (vinyl norbornene oxide) is represented by the formula

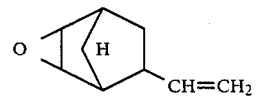

produced by epoxidation of 5-vinylbicyclohepta-2-en (vinyl norbornene), and can be produced by a Diels Alder reaction with butadiene and cyclopentadiene, using, e.g., peracetic acid or hydrogen peroxide.

An aliphatic or aromatic compound having an oxide group includes compounds having one epoxy group represented by the formula

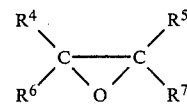

(wherein $R^4$, $R^5$, $R^6$, $R^7$ is hydrogen or alkyl group), for example,

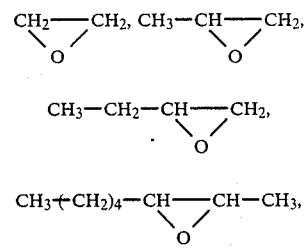

and α-olefin epoxide having an n value of from 2 to 25 represented by the formula

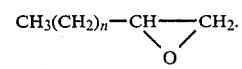

Furthermore, the compounds

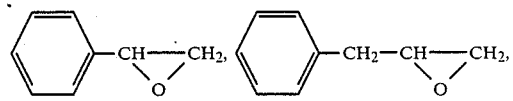

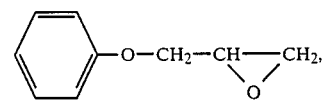

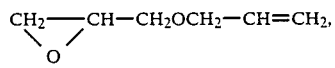

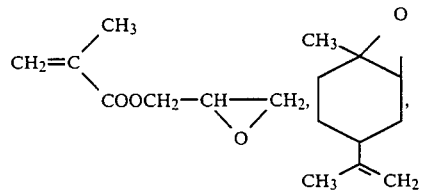

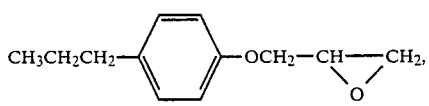

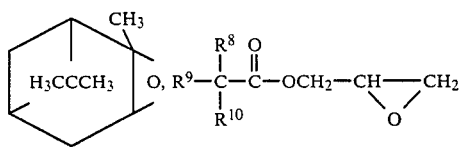

(wherein $R^8$, $R^9$, $R^{10}$ are groups of a tert-carbonic acid having from 9 to 11 carbon atoms), and

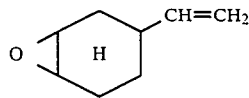

are also included therein.

The —A— groups include (a), (b), or (c)

(a) oxynorbornane structure having a vinyl group (b) a mixture of oxynorbornane structures having a vinyl group and —$R^2$—O— structures except oxycyclohexane structures having a vinyl group, and (c) a mixture of oxynorbornane structures having a vinyl group and oxycyclohexane structures having a vinyl group in the polyether compounds (I) of the present invention.

Also, 4-vinylcyclohexene-1-oxide can be produced commercially by epoxidation of 4-vinylcyclohexene, which is produced by dimerization reaction of butadiene, with peracetic acid or hydroperoxide.

For example, in the case that 5-vinylbicyclo[2.2.1]hepta-2-en-2-oxide (vinyl norbornene oxide)

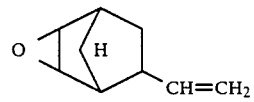

and a monoepoxy compound

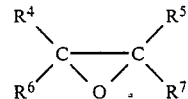

are used in the reaction for preparing the polyether compounds (I), —A— results in random ether groups or block ether groups composed of

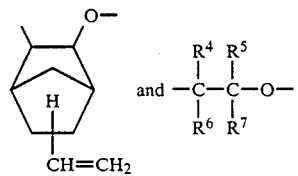

Inevitably, —B— results in random ether groups or block ether groups composed of

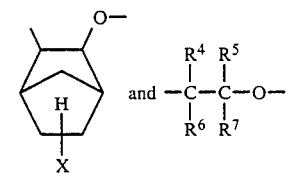

in the epoxy compounds (II).

In the case that a mixture of 5-vinylbicyclo[2.2.1]hepta-2-en-2-oxide (vinyl norbornene oxide) and a monoepoxy compound is reacted with an organic compound having active hydrogen atoms, the random product can be produced.

In the case that either of the vinyl norbornene oxide or the mono epoxy compound is reacted first with an organic compound having active hydrogen atoms and then the other is reacted, the block product can be produced.

Mixing ratio of vinylnorbornene oxide to mono epoxy compound is widely selected from 1 to 99%.

The polyether compounds (I) obtained by the present invention are useful as raw materials for preparing epoxy resin compounds according to the invention and resins having excellent hardness, strength, and weatherability can be obtained, because the basic skeleton is composed of norbornane rings.

The polyether compounds (I) can further be utilized for other reactions, because the double bond is a so-called end-double bond.

For example, they can be used as raw materials for silane coupling agents by adding silane compounds, or they can be utilized as modifying agents for unsaturated polyester resin, etc., by utilizing the radical polymerizability of the vinyl groups.

The epoxy resin compounds (II) of the present invention can be produced by reacting the polyether compounds (I) with epoxidating agent such as peracids or hydroperoxides.

As peracids, performic acid, peracetic acid, perbenzoic acid, trifluoroperacetic acid, etc., can be used.

Of these, peracetic acid is a preferable epoxidating agent, because it is available industrially at a moderate price and has high stability.

As hydroperoxides, hydrogen peroxide, tertiary butyl hydroperoxide, cumene peroxide, etc., can be used.

In carrying out epoxidation, catalysts can be used as is appropriate under the circumstances. In the case of peracids, for example, alkalis such as sodium carbonate, etc., or acid such as sulfuric acids, etc., can be used as catalysts. In the case of hydroperoxides, it is possible to obtain a catalytic effect, for example, by using a mixture of tungstic acid and sodium hydroxide together with hydrogen peroxide, or hexacarbonylmolybdenum together with tertiary butyl hydroperoxide.

The epoxidation reaction is carried out in the absence or presence of a solvent, controlling the reaction temperature according to the apparatus used and the properties of raw materials. The temperature region of the epoxidation reaction is selected according to the reactivity of the epoxidating agents.

In the case of peracetic acid, which is a preferable epoxidating agent, a preferable temperature region is 0° to 70° C. In the case of under 0° C., the reaction velocity is slow. On the other hand, in the case of over 70° C., a decomposition reaction of the peracetic acid occurs.

In the case of tertiary butyl hydroperoxide-molybdenum dioxide diacetyl acetate, which is an example of hydroperoxide, preferable temperature region is 20° to 150° C., based on the same considerations.

The use of solvents for dilution is effective in view of decreasing the viscosity of the raw materials and stabilization of epoxidation agents.

In the case of peracetic acid as epoxidating agents, a preferable solvent is an aromatic compound, an ether, etc.

The molar ratio of epoxidating agents to be used to unsaturated bonds can be selected according to the amount of the unsaturated bonds to be retained.

In the case of preparing epoxy compounds having many epoxy groups, an equal or higher molar ratio of epoxidating agents to the unsaturated bonds is preferably used.

However, using amounts of epoxidating agents at a molar ratio of more than 2 with respect to the unsaturated bonds are not preferable, because of cost and the side reaction described below.

In the case of peracetic acid, a ratio of from 1/1 to 1.5/1 is preferable.

After the above mentioned epoxidation reaction, the greater part of the vinyl groups in the polyether compounds (I) are changed to epoxy groups.

The resin compounds represented by formula (II) contain at least on

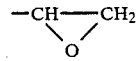

group, but it is more desirable that the number of

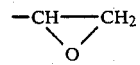

groups is greater, and, conversely, the number of

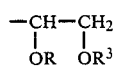

groups is smaller.

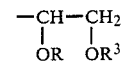

groups are produced by the side reaction between

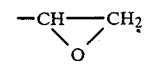

groups and by-produced acid.

I.e., the greater part of the substituents X in the formula

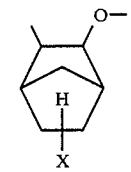

comprises

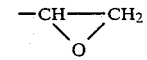

groups.

The —B— groups in the epoxy resin compounds (II) include (d), (e) or (f)

(d) oxynorbornane structures having substituents X (e) a mixture of oxynorbornane structures having substituents X and —R$^2$—O— structures except oxycyclohexane structures having a vinyl group (f) a mixture of oxynorbornane structures having substituents X and oxycyclohexane structures having substituents X in the epoxy compounds (II) of the present invention. n1 through nl in the epoxy compounds (II) are the same as in the polyether compounds (I).

l represents an integer of from 1 to 100, and defines the number of active hydrogen atoms in the organic compound having active hydrogen atoms which is a precursor of the residue group R$^1$.

For example, in the case of trimethylolpropane as an organic compound having active hydrogen atoms, l is 3.

R$^3$ is

in the case that epoxidating agent is peracetic acid.

Namely, —B— in the epoxy compounds (II) is composed of a mixture of composed of a mixture of

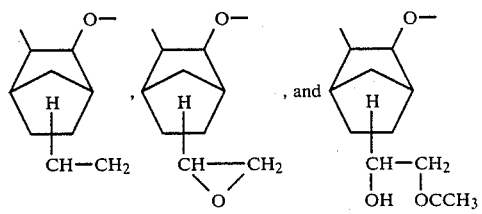

for example, in the case that the —A— groups in the polyether compound (I) are residue groups of vinyl norbornene oxide and the polyether compound (I) is epoxidated with peracetic acid.

The relative amounts of the three substituents described above depend upon the kind of epoxidating agent, molar ratio of the epoxidating agent to unsaturated bonds, and the reaction conditions.

The desired compound can be separated from the crude reaction solution by conventional chemical engineering means, such as a method in which a solvent is added, the acetic acid is removed by the addition of the water, and then, distillation is performed by means of, for example, a thin film evaporator, or a method in which the crude reaction mixture is directly introduced into a thin film evaporator to thereby distill off low-boiling point components.

The epoxy resins (II) obtained by the present invention are useful, and have excellent hardness, strength, and weatherability, because the basic skeleton is composed of norbornane rings.

Further, the epoxy resins can be cross-linked with phenol novolak resins or other curing agents to form compositions useful as excellent encapsulating materials for integrated circuits (e.g., so-called LSI and VSLI circuits) because of having a very low content of chlorine impurities.

Further, they have an advantage in that the performance thereof can be adapted for the prior uses of epoxides, such as immersion coils, etc., as substitutes therefor, by controlling the degree of polymerization, etc., as desired. In addition, they can be applied to various uses, such as encapsulating agents for LED (light emitting diode) or semiconductors, coatings, etc.

In the following, the present invention is illustrated in greater detail by examples, although it is to be understood that the invention is not limited thereto.

SYNTHESIS EXAMPLE 1

Synthesis of 5-vinylbicyclo[2.2.1]hepta-2-en-2-oxide (vinyl norbornene oxide):

1697.4 g (14.15 mols) of 5-vinylbicyclo[2.2.1]hepta-2-en (vinyl norbornene) was put into a reactor, and ethyl acetate solution containing 1075.8 g (14.15 mols) of peracetic acid was added dropwise while keeping a temperature of 40° C. for 5.5 hours, and was additionally aged while keeping the temperature of 40° C. for 1 hour after dropwise addition of the peracetic acid. The crude solution obtained by the above reaction was sufficiently washed with distilled water, and a transparent solution was obtained by rectification of the organic part of the solution.

The boiling point of the transparent solution was 91° C. at 25 Torr.

When an infrared ray absorption spectrum of the transparent solution product was compared with that of 5-vinylbicyclo[2.2.1]hepta-2-en (vinylnorbornene) of the raw material, absorption peaks of epoxy groups of 810 cm$^{-1}$ and 1270 cm$^{-1}$ were observed, and absorption peaks of vinyl groups of 1640 cm$^{-1}$ and 1820 cm$^{-1}$ were retained.

From the above results and an analysis with NMR, the structure represented by the following formula, which is 5-vinylbicyclo[2.2.1]hepta-2-en-2-oxide (vinyl norbornene oxide), was confirmed.

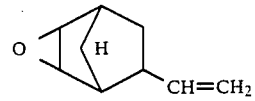

Synthesis of polyether compounds (I)=ring opening reaction between an organic compound having active hydrogen atoms and 5-vinylbicyclo[2.2.1]hepta-2-en-2-oxide (vinyl norbornene oxide):

9.8 g (0.073 mol) of trimethylolpropane as an organic compound having active hydrogen atoms and 150 g (1.1 mols) of vinyl norbornene oxide obtained by the above mentioned synthesis and ethyl acetate solution containing 13.05 g (0.092 mol) of BF$_3$ ehterate were mixed and reacted until the inversion ratio of vinyl norbornene oxide was changed to more than 99% at a temperature of 50° C.

The inversion ratio was measured with gas chromatography.

A crude reaction solution was obtained and the solution was washed with water to obtain a viscous liquid by concentration of the organic part. When an infrared ray absorption spectrum of resulted viscous liquid product was compared with that of 5-vinylbicyclo[2.2.1-]hepta-2-en (vinyl norbornene), absorption peaks of epoxy groups of 810 cm$^{-1}$ and 1270 cm$^{-1}$ disappeared, absorption peaks of ether bonds of 1080 cm$^{-1}$ and 1150 cm$^{-1}$ were formed, and absorption peaks of vinyl groups of 1640 cm$^{-1}$ and 1820 cm$^{-1}$ were retained.

From the above results and an analysis with NMR, the structure represented by the following formula (I-1) was confirmed.

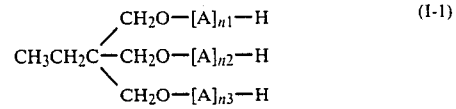

wherein A represents

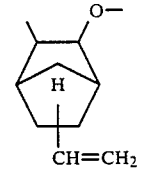

and n1, n2, n3=average 5. Synthesis of epoxy resin (II) comprising epoxidation reaction of the polyether compound (I-1) with peracetic acid:

Ethyl acetate solution containing 80 g of the polyether compound (I-1) was put into a reactor, and ethyl acetate solution containing 42 g of peracetic acid was added dropwise while keeping a temperature of 50° C. for 2 hours, and was additionally aged while keeping a temperature of 50° C. for 4 hours after adding peracetic acid to obtain a crude epoxidated solution.

Ethyl acetate was additionally added into the crude epoxidated solution, and the solution was washed with distilled water; then the organic part of the solution was separated to obtain a viscous liquid.

This viscous liquid compound had oxirane oxygen groups in an amount of 5.77 wt %.

When an infrared ray absorption spectrum of the resulting viscous liquid product was compared with that of the polyether compound (I-1), absorption peak of epoxy groups of 1250 cm$^{-1}$ was observed, absorption peaks of ether bonds of 1080 cm$^{-1}$ and 1150/cm were observed, an absorption peak of vinyl groups of 1640 cm$^{-1}$ was retained, and absorption peak of —OH groups of 3400 cm$^{-1}$ and an absorption peak of —CO—O— group of 1730 cm$^{-1}$ were observed.

From the above results and an analysis with NMR, the structure represented by the formula (II-1) was confirmed.

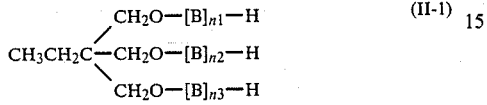

wherein B represents

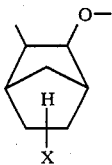

n1, n2, n3=average 5, and X represents —CH=CH$_2$,

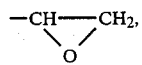

and

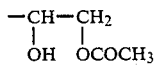

SYNTHESIS EXAMPLE 2

Synthesis of polyether compounds (I)=ring opening reaction between an organic compound having active hydrogen atoms and mixed epoxides composed of 5-vinylbicyclo[2.2.1]hepta-2-en-2-oxide (vinyl norbornene oxide) and 4-vinylcyclohexen-1-oxide (vinyl cyclohexene oxide):

16 g (0.5 mol) of methanol and 476 g (3.5 mols) of vinyl norbornene oxide and 434 g (3.5 mols) of vinyl cyclohexene oxide and ethyl acetate solution containing 71 g (0.5 mol) of BF$_3$ etherate were mixed and reacted until oxirane oxygen groups became less than 1% at the temperature of 50° C.

A crude reaction solution was obtained and the solution was sufficiently washed with distilled water to obtain a viscous liquid by concentration of the organic part.

When an infrared ray absorption spectrum of the viscous liquid product was compared with those of 5-vinylbicyclo[2.2.1]hepta-2-en-2-oxide (vinyl norbornene oxide) of the raw material and 4-vinylcyclohexen-1-oxide (vinyl cyclohexene oxide), absorption peaks of epoxy groups of 810 cm$^{-1}$ and 1270 cm$^{-1}$ disappeared, an absorption peak of ether bonds of 1080 cm$^{-1}$ was formed, and absorption peaks of vinyl groups of 1640 cm$^{-1}$ and 1820 cm$^{-1}$ were retained.

From the above results and an analysis with NMR, it was confirmed that the structure of the product was represented by the following formula (I-2)

$$CH_3O-[A]_n-H \qquad (I-2)$$

wherein A represents a mixture of the following formulae.

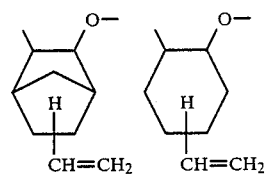

Synthesis of epoxy resin (III) comprising epoxidation reaction of the polyether compound (I-2) with peracetic acid:

Ethyl acetate solution containing 555.6 g of the polyether compound (I-2) was put into a reactor, and ethyl acetate solution containing 319.2 g of peracetic acid was added dropwise while keeping the temperature of 50° C. for 5 hours, and was additionally aged while keeping the temperature at 50° C. for 3 hours after dropwise adding the peracetic acid to obtain a crude epoxidated solution.

Ethyl acetate was additionally added into the crude epoxidated solution and the solution was washed with distilled water; then the organic part of the solution was separated to obtain a viscous liquid.

This viscous liquid compound had oxirane oxygen groups of 9.27%.

When an infrared ray absorption spectrum of resulted viscous liquid product was compared with that of the polyether compound (I-2), an absorption peak of epoxy groups of 1250 cm$^{-1}$ was observed, an absorption peak of vinyl groups of 1640 cm$^{-1}$ was retained, and an absorption peak of ester groups of 1730 cm$^{-1}$ was observed.

From the above results and an analysis with NMR, it was confirmed that the above compound was the epoxy compound represented by the formula (II-2)

$$CH_3O-[B]_n-H \qquad (II2)$$

wherein B represents a mixture of

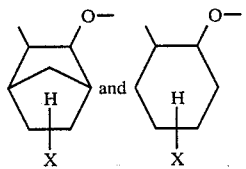

n=about 15, X represents —CH=CH$_2$ and

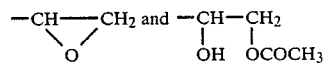

EXAMPLE 1

100 parts of the epoxy compound obtained in Synthesis Example 1 and 39.7 parts of a phenol resin (PSF 4300 produced by Gunei Chemical Co., Ltd., phenol equivalent 110) and 0.7 parts of triphenyl phosphine were melted and blended to obtain an epoxy resin composition.

The resulting composition was cooled and powdered, and then molded by compression under a pressure of 100 kg/cm² at 90° C., followed by curing at 170° C. for 5 hours to obtain a cured product. The glass transition temperature of the cured product was 205° C., and the water absorption ratio (weight of water/dry weight of cured product) was 0.18% after an immersion time of 24 hours in water at a temperature of 20° C.

EXAMPLE 2

100 parts of the epoxy compound obtained in Synthesis Example 2 and 63.7 parts of a phenol resin and 0.8 parts of a triphenyl phosphine were used in the same manner as in Example 1 to obtain the resulting cured product having the glass transition temperature of 210° C. and the water absorption ratio of 0.22%.

While the invention has been described in detail and with reference to specific embodiments thereof, it will be apparent to one skilled in the art that various changes and modifications can be made therein without departing from the spirit and scope thereof.

What is claimed is:

1. An epoxy resin represented by formula (II)

wherein R¹ represents a residue group of an organic compound having l active hydrogen atoms, n1 through n$_l$ each represents 0 or an integer of from 1 to 100, the sum of integers represented by n1 through n$_l$ is from 1 to 100, and l represents an integer of from 1 to 100, and B represents an oxynorbornane unit having a substituent

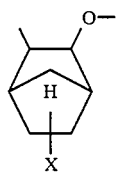

or a mixture of

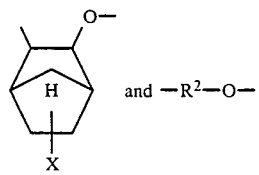

wherein R² represents a residue group of a mono epoxy compound, X represents a

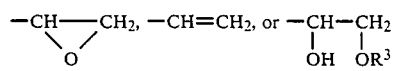

group,
wherein R³ represents a hydrogen atom, an alkyl group, an alkylcarbonyl group or an arylcarbonyl group, provided that the epoxy resin represented by formula (II) contains at least one

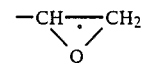

group.

2. An epoxy resin as in claim 1, wherein said R² is

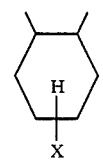

3. An epoxy resin as in claim 1, wherein said R² is a residue group of alpha olefin mono epoxide.

4. An epoxy resin as in claim 1, wherein said R¹ is the residue group of an organic compound selected from the group consisting of an alcohol, a phenol, a carboxylic acid, an amine, and a thiol.

5. An epoxy resin as in claim 4, wherein said organic compound is an alcohol.

6. An epoxy resin as in claim 5, wherein said alcohol is trimethylolpropane.

7. A process for production of an epoxy resin represented by formula (II)

comprising reacting a polyether represented by formula (I)

with an epoxidation agent in the presence of catalyst,
wherein R¹ represents a residue group of an organic compound having l active hydrogen atoms, n1 through nl each represents 0 or an integer of from 1 to 100, the sum of integers represented by n1 through nl is from 1 to 100, and l represents an integer of from 1 to 100, and B represents an oxynorbornane unit having a substituent

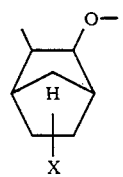

or a mixture of

[structure]and —R²—O— wherein R² represents a residue group of a mono epoxy compound, X represents a

—CH—CH₂ (epoxide), —CH=CH₂, or —CH—CH₂ with OH and OR³ group,
wherein R³ represents a hydrogen, an alkyl group, an alkyl carbonyl group, an arylcarbonyl group, provided that the epoxy resin represented by formula (II) contains at least one —CH—CH₂ (epoxide)

group and A represents

[structure with CH=CH₂]

or a mixture of

[structure with CH=CH₂] and —R²—O—.

* * * * *